Jan. 24, 1933.  A. J. GRANBERG  1,895,318
FLUID METER
Filed April 14, 1930  4 Sheets-Sheet 1

INVENTOR.
Albert J. Granberg
BY
Townsend, Loftus & Attett
ATTORNEYS.

Jan. 24, 1933.  A. J. GRANBERG  1,895,318
FLUID METER
Filed April 14, 1930   4 Sheets-Sheet 4
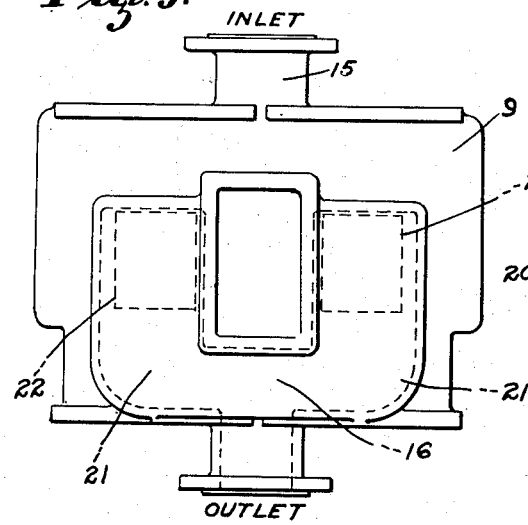
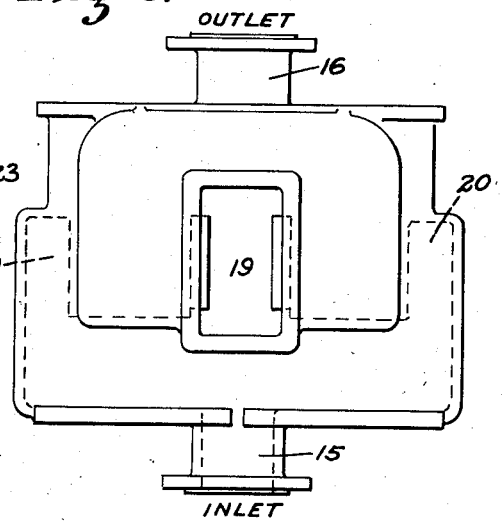
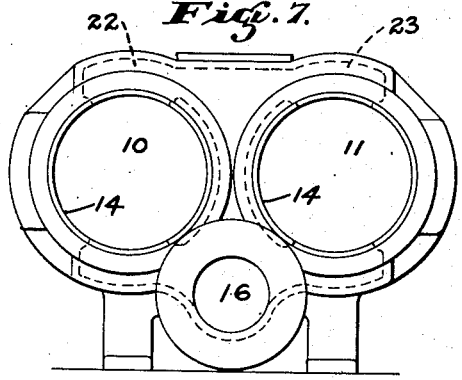
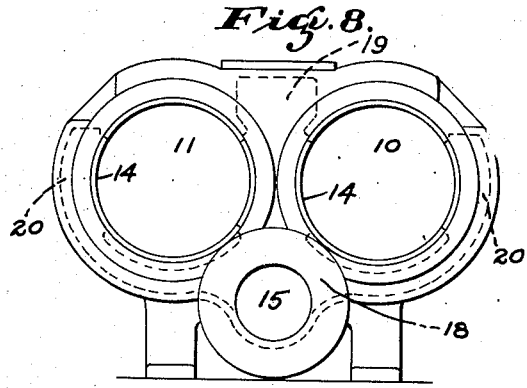
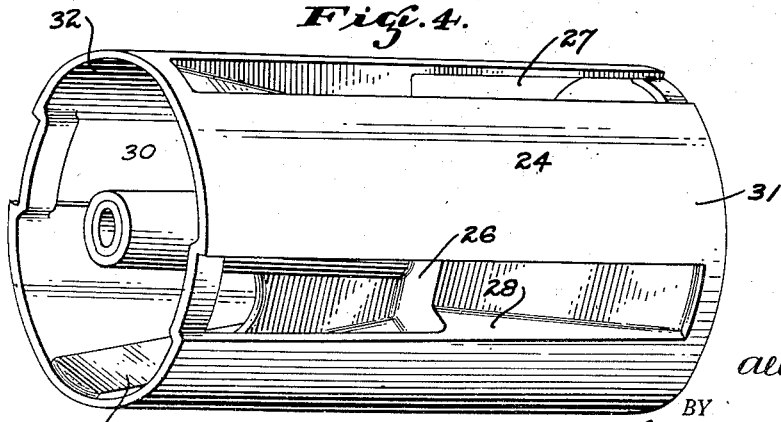
INVENTOR.
Albert J. Granberg
BY
Townsend, Loftus & Abbott
ATTORNEYS.

Patented Jan. 24, 1933

1,895,318

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

FLUID METER

Application filed April 14, 1930. Serial No. 444,095.

This invention relates to fluid meters and particularly pertains to a reciprocating piston type of meter which may be interposed in a pipe line to indicate the volume of fluid passing therethrough.

It is the principal object of the present invention to generally improve the construction and operation of meters of the character referred to by providing a meter of the reciprocating piston type which is compact and simple in construction and which will operate efficiently under all operating conditions to accurately measure the volume of fluid passing therethrough.

In carrying the invention into practice I provide a meter casing including a pair of parallel cylinders, each of which is fitted with a reciprocable and turnable piston. Cooperative ports are formed in the pistons and cylinders so that the entrance of fluid into the casing will cause the pistons to reciprocate in synchronism and in overlapping cycles. The movement of the pistons is translated by an indicating mechanism into quantities of fluid displaced thereby. The intake and discharge ports of the pistons and cylinders are so arranged that any foreign matter or air in the fluid will be readily discharged from the meter so as to insure accurate operation thereof.

One form which the invention may assume is exemplified in the following description and illustrated by way of example in the accompanying drawings, in which:

Fig. 4 is a perspective view of one of the pistons used.

Figure 1:
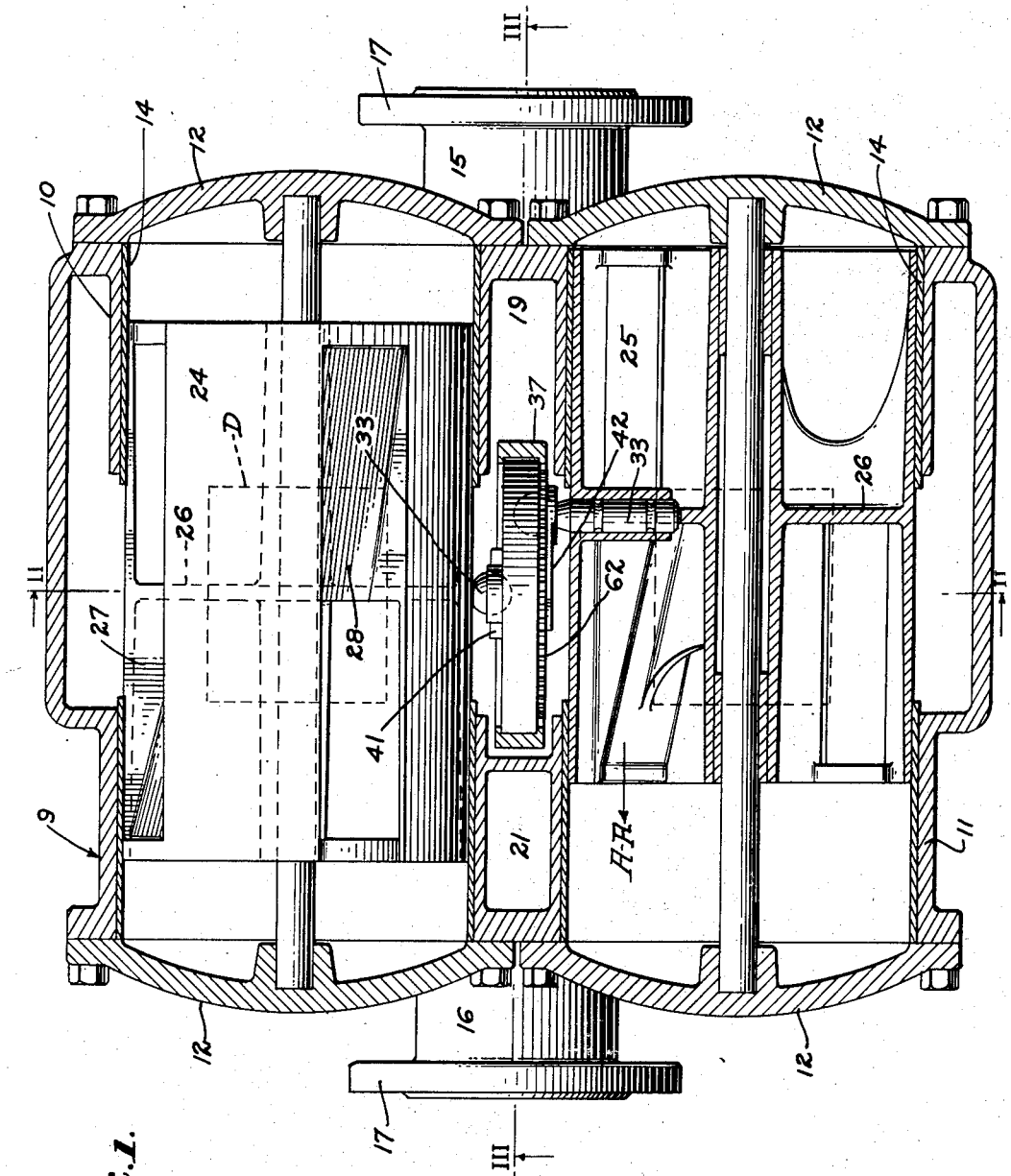
Fig. 1 is a view in plan section through the meter embodying the preferred form of my invention.

Figs. 5 to 8 inclusive are diagrammatic illustrations disclosing the manner in which the fluid flows through the meter.

Referring more particularly to the accompanying drawings, 9 indicates a fluid meter which is adapted to be interposed in a pipe line to measure and indicate the volume of fluid passing therethrough. The meter in the present instance includes a body casting formed with a pair of parallel cylinders 10 and 11 which are identical in construction. The ends of the cylinders in the body casting are enclosed by head members 12 bolted or otherwise suitably connected to the body casting. The cylinders 10 and 11 are arranged in parallelism with the longitudinal center of the body casting and are spaced at equal distances on opposite sides of the center thereof as indicated.

Each cylinder is fitted with a liner 14 and the liners of the two cylinders are also identical in construction and each is formed with four ports A, B, C and D, the ports A and B being in transverse alignment while the ports C and D are in vertical alignment. The ports A and B are located on the transverse center line of the cylinder while the ports C and D are located on the vertical center line of the cylinder. The ports are, of course, as illustrated, spaced ninety degrees apart.

Arranged on the longitudinal center line of the body casting and at opposite ends thereof is an inlet port 15 and an outlet port 16. The ports 15 and 16 are surrounded by suitable flanges 17 so that the meter may be connected with other apparatus or interposed in a pipe line through which fluid to be metered is conducted.

The intake port 15 communicates with intake chambers 18, 19 and 20. The chambers 18 and 20 are arranged at opposite sides of the body casting so that the chambers 20 are in communication with the ports A of the cylinders 10 and 11, while the intake chamber 19 communicates with the ports B in the cylinders.

The outlet port 16 is in communication with outlet chambers 21, 22 and 23 formed in the body casting. The outlet chambers 22 and 23 are located one at the top of each cylinder and in communication with the ports C in the cylinders while the outlet chamber 21 is arranged beneath the cylinders 10 and 11 and in communication with the ports D.

The outlet and inlet chambers are not in communication with each other except through the medium of the cylinders 10 and 11 and this communication is so controlled by pistons 24 and 25 in the cylinders 10 and 11 that the fluid passing from the inlet port 15 through the chambers and the cylinders to the outlet port 16 actuates the pistons and through the pistons operates an indicating or counting device which indicates the volume of the fluid passing from the inlet to the outlet ports. As the pistons are identical in construction the construction of but one will be described.

Each piston is centrally and transversely divided by a partition wall 26 and is formed with four ports indicated by the numerals 27, 28, 29 and 30. The ports are formed through the peripheral piston wall and the ports 27 and 29 are in communication with the end 31 of the piston, while the ports 28 and 30 communicate with the opposite end of the pistons or that indicated by the numeral 32. The ports 27 to 30 inclusive are so formed, however, that they extend the full length of the piston without forming communication between the opposite ends of the piston. This feature of construction is best shown in Figure 4 of the drawings where it clearly appears that the ports 27 and 29 communicate with the end 31 of the piston only owing to the fact that they are separated from the end 32 by a small housing or partition extending inwardly from the walls of the piston. Similarly the ports 28 and 30 are separated from the end 31 of the piston and communicate only with the end 30 thereof, thus, when the ports 27 and 29 of the pistons are in communication with the inlet ports fluid from the inlet chambers is delivered to the end 31 of the pistons and cause the piston to move in the direction of the arrow AA.

At the time when the ports 27 and 29 are in register with the intake ports of the cylinder, the other two ports will be in register with the discharge ports of the cylinder and will cause fluid to flow through these ports to the outlet chambers in the body casting. However, the operation of the piston is such that on each alternate cycle of operation the ports 28 and 30 will register with the intake ports in the cylinder and fluid from the intake chambers will be delivered to the opposite end of the piston or that indicated by 32, and will cause the piston to move in the opposite direction. At this time the ports 27 and 29 will be in register with the outlet ports in the cylinder so that fluid may discharge from the end 31 of the pistons into the outlet chambers in the body casting.

In order to operate the pistons so as to accomplish this registering of the ports, the pistons are oscillated while they are being reciprocated, which oscillation if so timed relative to the reciprocating strokes of the pistons that the ports in the pistons properly register with the ports in the cylinders so that the fluid passing into the inlet chambers of the body casting will cause the pistons to reciprocate.

To accomplish this purpose each piston is fitted with a radial arm 33 which is connected with a rotatable synchronizer 34. This rotatable synchronizer consists of a revoluble ring 35 which in reality is the inner race of a ball bearing 36. The outer race of this bearing is secured in a bracket 37 rigidly depending into the body casting between the cylinders in the intake chamber 19. Secured to this ring 35 is a center disk 38 which is formed with two radial slots 39 and 40 which are spaced at ninety degrees apart. Arranged in each radial slot 39 and 40 are socket members 41 and 42 which are engaged by the radial arms 33 on the pistons. Engagement of the radial arms 33 with the sockets 41 and 42 connects these radial arms to the rotatable synchronizer at eccentric points on the latter so that as the pistons reciprocate, the rotatable synchronizer is revolved causing the ends of the radial arms 33 to travel in a circular path about the axis of the rotatable synchronizer and thereby causing the pistons to oscillate as they reciprocate. The sockets 41 and 42 are adjustable relative to the center of rotation of the rotatable synchronizer as will hereinafter be set forth so that the stroke of the pistons may be adjusted to adjust the meter.

From the drawings it will be seen that at the center of the disk 38 is a rotatable trunnion 43 having eccentric ends 44 and 45 which are formed with the same amount of eccentricity but ninety degrees apart, the same as the sockets 41 and 42. The eccentric portions 44 and 45 of the trunnion 43 rotatably engage the inner ends of the socket members 41 and 42. These sockets members are normally held in fixed position relative to the disk 38 by cap screws 46. However, by loosening these caps screws 46 and revolving the trunnion 43 the radial distance between the center of the sockets 41 and 42 and the disk 38 may be changed to lessen or increase the strokes of the pistons.

It will be seen from the drawings that a pin 50 extends transversely into the trunnion 43 and is disposed in a recess formed in the disk 38. A calibrated scale 51 is formed concentrically about the center of the disk and in cooperative relation to the pin 50 so that the amount of turning movement imparted to the trunnion by adjusting the position of the pin 50 may be accurately determined. In other words, by moving the pin 50 according to the scale 51, the stroke of the pistons may be adjusted to a predetermined degree. After the pin 50 has been moved to effect the proper adjustment, the cap screws 46 are re-tightened so as to maintain the socket members 41 and 42 in their adjusted positions.

Figure 2:
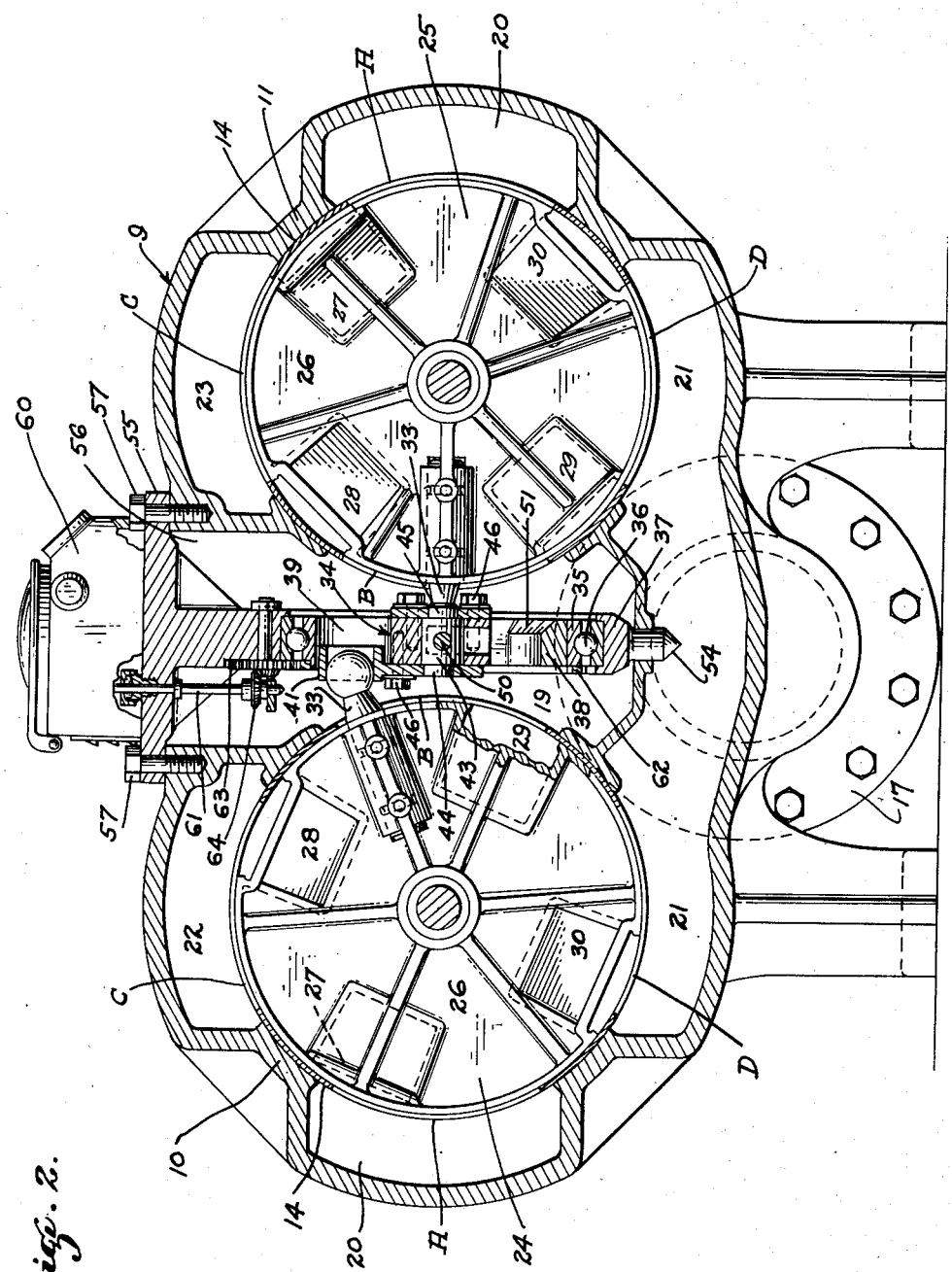
Fig. 2 is a transverse section through the same taken on line II—II of Fig. 1.
Figure 3:
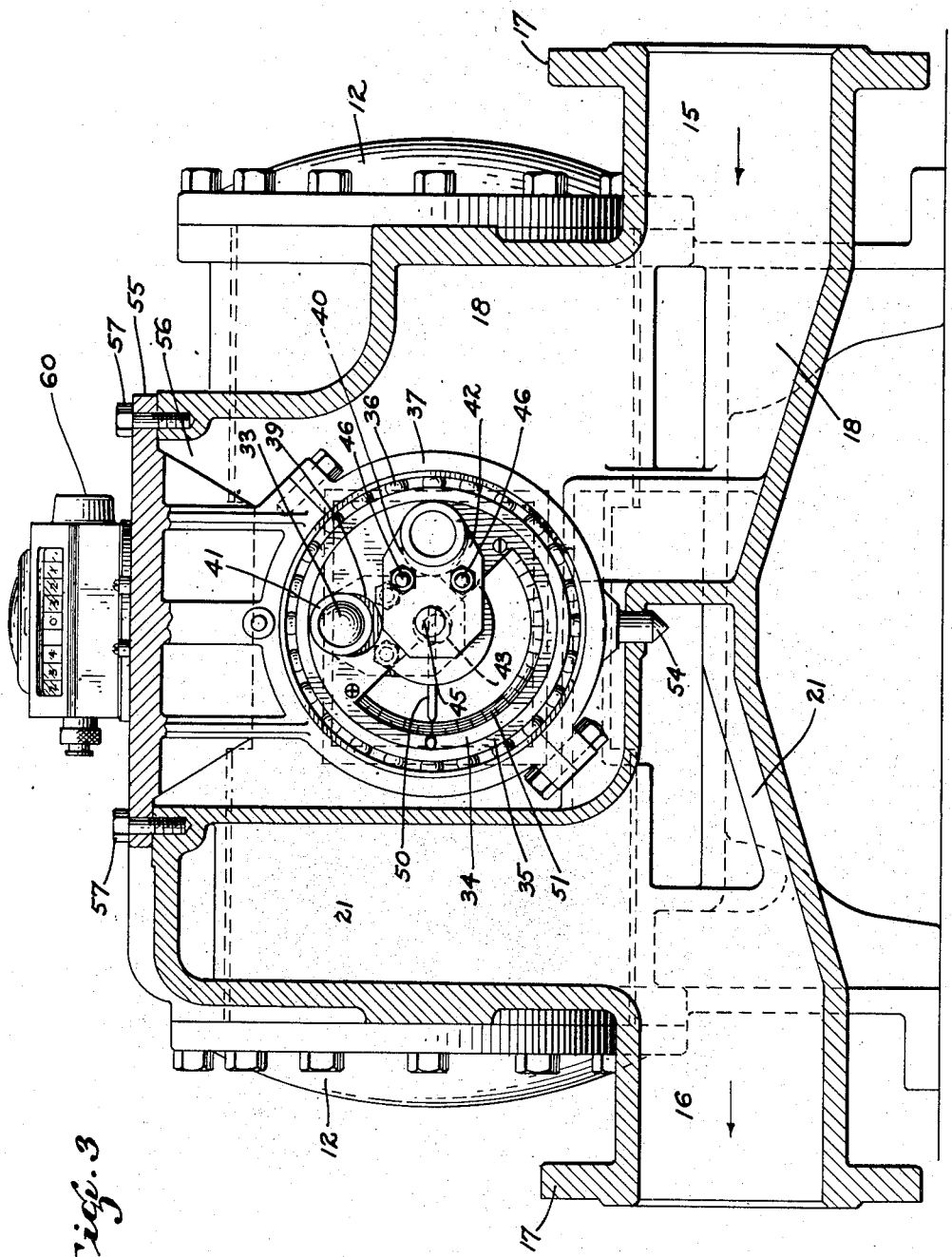
Fig. 3 is a longitudinal section through the meter taken on line III—III of Fig. 1.

From Fig. 2 of the drawings it will be seen that the bracket member 37 which carries the synchronizing mechanism is formed with a pintle 54 at its lower end which engages a socket in one of the partition walls of the body casting. The upper end of the bracket 37 is formed with a flange 55 which acts as a cover plate for an enlarged opening 56 formed in the top of the body casting. The flange 55 is securely connected with the body casting by cap screws 57. By removing these cap screws, the flange 55 may be disconnected from the body casting, and the bracket 37 together with the synchronizing mechanism may be removed from the body casting.

It is obvious that after the cap screws 57 have been removed, slight elevation of the bracket 37 will cause the rotatable synchronizer to turn until the radial arms 33 of the pistons are in their lower most position. The bracket 37 may then be turned about a vertical axis in a direction causing the withdrawal of the arms 33 from the sockets 41 and 42. The bracket together with the synchronizing mechanism may then be withdrawn from the body casting and any adjustments made.

To reconnect the synchronizing mechanism with the pistons, it is only necessary to insert the synchronizing mechanism in the same position that it was withdrawn and to turn the synchronizing mechanism and bracket in a direction causing reengagement of the arms 33 with the socket members 41 and 42. The cap screws 57 are then applied to firmly secure the bracket 37 in position.

In order to indicate the volume of the fluid passing through the meter, I provide a counter mechanism 60 of any preferred type which is mounted on the flange 55 of the bracket 37. This counter mechanism is so connected with the synchronizing device that the strokes of the pistons are registered through the revolving of the synchronizing device. As the displacement of the pistons can be accurately determined, the strokes thereof can be tallied and through the medium of a proper counting device indicated in fluid quantities.

To operate the counter device it is provided with a drive shaft 61 which is driven by a ring gear 62 secured to the rotatable synchronizer through the medium of a pinion 63 and a pair of bevel gears 64. The ratio between these gears is such that when the meter is in operation, the strokes of the pistons will be tallied and translated into quantities of fluid passing through the meter which will be indicated by the counter mechanism.

It has been previously pointed out that radial arms 33 of the pistons are arranged at ninety degrees apart. The reason for this is so that the pistons will operate in overlapping cycles and will cooperate to move each other over dead center. In other words, when one piston reaches dead center the other piston will be operating and through the medium of the synchronizing device will move the other piston from dead center and again place it in operation.

In operation of the meter, fluid entering the inlet port will pass into the inlet chambers 18, 19 and 20 and assuming that the pistons are in the position shown in Fig. 2, the fluid will pass through the ports A and B in the cylinder 10 and through the ports 27 and 29 in the piston 24 to the end 31 of the piston, causing the piston to move in the direction of the arrow AA. The fluid in the cylinder at the other end of the piston will pass through the ports 28 and 30 in the piston and through the ports C and D in the cylinder into the discharge chambers 21 and 22 and pass out of the body casting through the discharge port 16.

As the piston is reciprocated by this action of the fluid, the piston will be turned due to its connection with the synchronizing device 34. At this time the piston 25 will be on dead center but due to the fact that the piston 24 is in operation the movement of the piston 24 will, through the medium of the synchronizing device 34, impart turning movement to the piston 25 and rotate the piston 25 in a clockwise direction as in Fig. 2. This rotation of the piston 25 will place its ports 27 and 29 in register with the intake ports A and B of the cylinder 11 and the piston will commence to move axially in the same direction as that in which the piston 24 is moving.

When the ports 27 and 29 commence to register with the ports A and B in the cylinder 11, the ports 28 and 30 will commence to register with the ports C and D in the cylinder 11 so that fluid will enter at one end of the piston from the intake chambers and will be displaced at the opposite end into the discharge chambers.

When the piston 24 reaches the end of its stroke, all of the ports 27 to 30 inclusive will be out of register with the ports in the cylinder 10 and the piston will be on dead center. At this time the piston 24 will be on dead center while the piston 25 has commenced its stroke. The movement of the piston 25 will, of course, be transmitted through the synchronizing device 34 to the piston 24 causing the same to be turned and place the ports 28 and 30 in register with the intake ports A and B of the cylinder and to place the ports 27 and 29 in register with the discharge ports C and D of the cylinder 10. Therefore, fluid from the inlet chambers will pass to the end 32 of the piston and fluid being displaced by the piston will discharge through the ports 27 and 29 of the piston into the discharge chambers 21 and 22 of the body casting and thence through the outlet port.

It will be noticed that the fluid discharging through the cylinders passes through upper and lower ports so that heavy foreign matter if present in the fluid may pass into the discharge chamber without any danger of it getting into the working parts. Likewise, any air present in the fluid may rise and discharge through the upper ports so that it will not lodge in the meter and prevent accurate operation thereof.

From the foregoing it is obvious that 1 have provided a very accurate and efficient meter for measuring fluid quantities, which meter is comparatively simple in construction and efficient in operation.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a body casting having a pair of horizontally disposed parallel cylinders formed therein, a central intake chamber formed between the cylinders, and an intake chamber formed at the opposite side of each cylinder, said body casting being formed with an intake port in communication with said intake chambers and outlet chambers at the top and bottom of the cylinders, said body casting being formed with an outlet port in communication with said outlet chambers, a piston in each cylinder, said chambers and said pistons being formed with cooperative ports whereby fluid is alternately admitted to opposite ends of the pistons to reciprocate the same, a connection between said pistons whereby they will operate in synchronism, a counter mechanism and means operatively connecting said counter mechanism to the pistons for indicating the amount of fluid passing by the meter.

2. A meter comprising a body casting having a pair of horizontally disposed parallel cylinders formed therein, a central intake chamber formed between the cylinders, and an intake chamber formed at the opposite side of each cylinder, said body casting being formed with an intake port in communication with said intake chambers and outlet chambers at the top and bottom of the cylinders, said body casting being formed with an outlet port in communication with said outlet chambers, a piston in each cylinder, said cylinders being each formed with a pair of inlet ports in communication with the inlet chambers, each cylinder being formed with a pair of outlet ports in communication with the outlet chambers, each piston being centrally divided, each piston being formed with two pairs of ports, one pair communicating with one end of the piston, the other pair communicating with the opposite end of the piston, synchronizing means connected with the pistons for alternately registering said pairs of ports with said intake and outlet ports in the cylinders.

3. A meter comprising a body casting having a pair of horizontally disposed parallel cylinders formed therein, a central intake chamber formed between the cylinders, and an intake chamber formed at the opposite side of each cylinder, said body casting being formed with an intake port in communication with said intake chambers and outlet chambers at the top and bottom of the cylinders, said body casting being formed with an outlet port in communication with said outlet chambers, a piston in each cylinder, said cylinders being each formed with a pair of inlet ports in communication with the inlet chambers, each cylinder being formed with a pair of outlet ports in communication with the outlet chambers, each piston being centrally divided, each piston being formed with two pairs of ports, one pair communicating with one end of the piston, the other pair communicating with the opposite end of the piston, synchronizing means connected with the pistons for alternately registering said pairs of ports with said intake and outlet ports in the cylinders, a counting mechanism, means operatively connecting said counting mechanism to the pistons for indicating the amount of fluid passing through the meter and means for adjusting the strokes of the pistons.

4. A meter comprising a body casting having a pair of horizontaly disposed parallel cylinders formed therein, a central intake chamber formed between the cylinders, and an intake chamber formed at the opposite side of each cylinder, said body casting being formed with an intake port in communication with said intake chambers and outlet chambers at the top and bottom of the cylinders, said body casting being formed with an outlet port in communication with said outlet chambers, a piston in each cylinder, said cylinders being each formed with a pair of inlet ports in communication with the inlet chambers, each cylinder being formed with a pair of outlet ports in communication with the outlet chambers, each piston being centrally divided, each piston being formed with two pairs of ports, one pair communicating with one end of the piston, the other pair communicating with the opposite end of the piston, synchronizing means connected with the pistons for alternately registering said pairs of ports with said intake and outlet ports in the cylinders, said synchronizing means operatively connecting the pistons whereby the pistons will operate in synchronism and in overlapping cycles.

5. A meter comprising a pair of horizontally disposed parallel cylinders, an intake chamber intermediate the cylinders, an intake chamber at the outside of each cylinder, and a discharge chamber at the top and at the bottom of each cylinder, a piston reciprocably mounted in each cylinder, each cylinder having intake and discharge ports formed therein, said pistons having ports adapted to cooperate with the ports of the cylinders, crank means for each piston adapted to oscillate the piston during the reciprocation thereof, said oscillation of the piston controlling the registering of the ports in the pistons with the ports in the cylinders whereby to admit fluid alternately to opposite ends of the cylinders and to permit fluid at the opposite ends of the cylinders to be displaced by the pistons during the strokes thereof, and means operatively connecting the crank means of the pistons whereby the pistons will operate in overlapping cycles, an indicating means and means operatively connecting said indicating means to the pistons to indicate the volumes of fluid displaced by the pistons.

6. A fluid meter comprising a body casting having a pair of cylinders formed therein, each cylinder being formed with a pair of intake ports 180 degrees apart and a pair of discharge ports 180 degrees apart and disposed at 90 degrees relative to the intake ports, a piston in each cylinder, each piston being centrally and transversely divided, the periphery of each piston end being formed with a pair of ports 180 degrees apart, the pairs of ports in opposite ends of the piston being disposed 90 degrees apart, crank means operatively connected to the pistons to oscillate the same during the reciprocation thereof whereby the ports therein will alternately register with the intake and discharge ports in the cylinders.

7. A fluid meter comprising a body member having a pair of cylinders formed therein, each cylinder being formed with a pair of oppositely disposed intake ports and a pair of discharge ports alternately arranged with relation to the intake ports, a piston in each cylinder, a central transverse partition in each piston, two pairs of ports in the periphery of each piston, each pair of ports being in communication with opposite ends of the piston, means to cause the pistons to oscillate in synchronism upon reciprocable movement thereof, said pairs of ports being so disposed that one pair registers with said intake and the other pair with said discharge ports and being so spaced as to alternately register with the intake and discharge ports in the cylinders upon oscillation of the pistons.

8. In combination with a fluid meter of the character described comprising a pair of cylinders and pistons mounted for reciprocation and oscillation about their longitudinal axes therein, said cylinders and pistons having ports therein adapted to be opened and closed upon oscillation of the pistons, means connecting said pistons to synchronize the movement thereof, and means to simultaneously adjust the reciprocable and oscillatory movement of the pistons.

ALBERT J. GRANBERG.